Aug. 29, 1950     D. W. MADDEN     2,520,418

SMOKING PIPE REAMER

Filed March 3, 1947

INVENTOR
DAVID W. MADDEN
BY
*Richard C. Lindberg*
ATTORNEY

Patented Aug. 29, 1950

2,520,418

UNITED STATES PATENT OFFICE 2,520,418

SMOKING PIPE REAMER

David W. Madden, Chicago, Ill.

Application March 3, 1947, Serial No. 731,974

6 Claims. (Cl. 131—246)

The present invention relates to a cleaner or reamer for bowls of smoking pipes, and has particular reference to a reamer which may be adjusted for pipe bowls of different diameters.

One of the principal objects of the invention is to provide a pipe reamer which is simple in construction, simple in assembly, and easy of operation.

A further object is to provide a reamer of rugged construction which employs a pair of reamer blades, either of which is used according to the size of a pipe bowl to be reamed.

Still another object is to provide in a reamer of the kind contemplated a small reamer blade for reaming pipe bowls of small diameter, a larger reamer blade for reaming pipe bowls of larger diameters, the two blades being so arranged that the smaller blade can be employed to the exclusion of the larger blade, and the blades being arranged to have telescopic relationship when it is desired to use the larger blade.

Other objects and advantages of the invention will be apparent from a study of the description hereinafter taken together with the drawings, but it is to be understood that the invention is not limited in terms of the embodiment shown in the drawings nor otherwise than by the terms of the claims appended.

Figure 1:
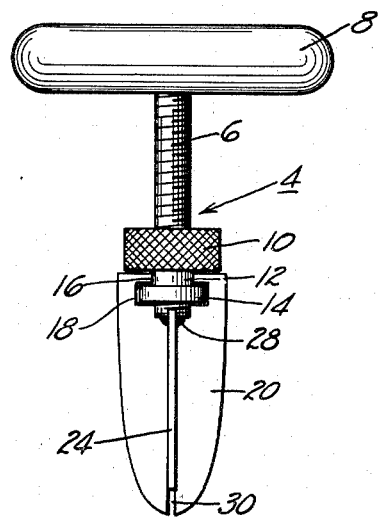
Figure 1 is a side view of a pipe reamer according to the present invention.
Figure 2:
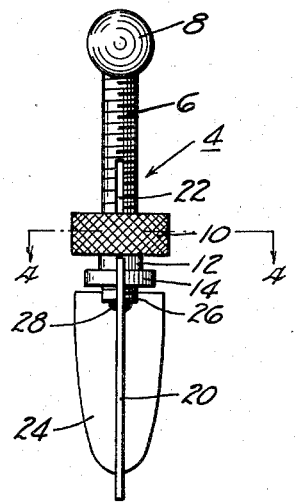
Figure 2 is an end view thereof.
Figure 4:
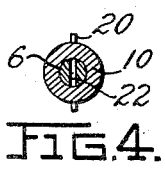
Figure 4 is a section taken through the knurled member and threaded shank shown in Figures 1 to 3 taken along the line 4—4 of Figure 2 and looking in the direction of the arrows.

Referring now particularly to Figures 1 and 2, the pipe reamer according to the present invention is indicated generally by the ordinal 4 and comprises a threaded shank member 6 which has secured in any convenient fashion at one end thereof an operating handle 8. The threaded shank 6 has in threaded engagement therewith a knurled member 10 which has an extension to provide a groove portion 12 and a land portion 14.

Figure 3:
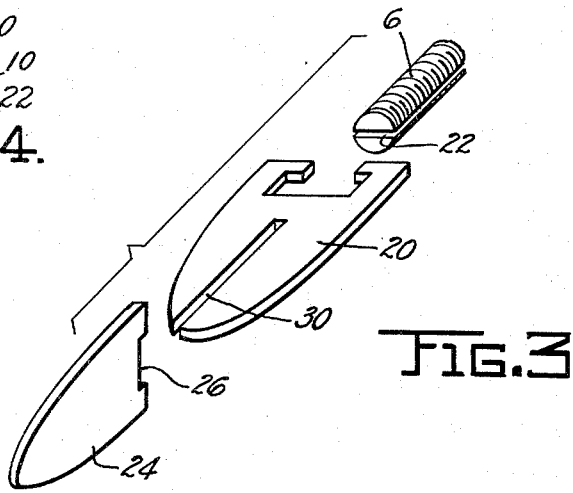
Figure 3 is an isometric view of part of the elements shown in Figures 1 and 2 showing how they may be assembled.

The groove portion 12 and the land portion 14 are adapted to engage, see Figure 3, with a cooperating land portion 16 and a groove portion 18 of a large reamer blade 20. Provision is made to permit the large reamer blade 20 to move longitudinally of the threaded shank 6 and upon rotation of the member 10, and to this end the threaded shank member 6 has a slot 22 therein which is wide enough to accommodate the thickness of the reamer blade 20.

Secured to the lower end of the threaded shank 6 is a smaller reamer blade 24 which has a small cutout portion 26, the width equal to the outside diameter of the threaded shank 6. The smaller reamer blade 24 may be secured to the shank by means of spot welding as shown at 28. The reamer blades 20 and 24 are adapted to move telescopically as shown in Figures 1 and 2 upon rotation of the member 10, by means of a slot 30 cut in the lower extremities of the larger reamer blade 20, the slot 30 being of a width equal to the thickness of the smaller reamer blade 24.

The device thus far described is assembled first by threading the member 10 on the threaded shank 6 with the groove and land portions 12 and 14 extending therefrom. The land and groove portions 16 and 18 of the larger reamer blade 20 are brought into cooperating engagement with the groove and land portions 12 and 14 of the member 10, and upon rotation of the member 10 the larger reamer blade 20 will move in the slot 22 longitudinally of the threaded shank 6 and will be held in position to the threaded member 10. Thereafter, the smaller reamer blade 24 may be secured to the lower end of the threaded shank member 6 by means of welding or brazing as shown at 28.

The device thus far described operates as follows:

When it is desired to ream a pipe bowl of smaller diameter, the threaded and knurled member 10 is rotated on the shank 6 and the larger reamer blade 20 is moved by such rotation telescopically with respect to the smaller reamer blade 24, and after sufficient rotation of the threaded and knurled member 10 has taken place, the smaller reamer blade 24 only will be in position for reaming a pipe bowl of smaller diameter.

When it is desired to ream a pipe bowl of larger diameter, the threaded and knurled member 10 is rotated in the opposite direction thereby moving the larger reamer blade 20 telescopically with respect to the smaller reamer blade 24 in the opposite direction, and a larger pipe bowl may then be reamed by the larger reamer blade 20.

It will be seen from the foregoing description that there has been provided a pipe reamer of simple and sturdy construction which will readily ream pipe bowls of different diameters.

While the invention has been described in a preferred embodiment thereof, it is to be understood that it is not to be limited in terms of the embodiment shown.

I claim:

1. A smoking pipe reamer comprising a threaded shank provided with a slot, an operating handle secured at one end of said threaded shank, a reamer blade of small width secured to the other end of said threaded shank, a reamer blade of large width adapted to move in said slot, and a member carrying said reamer blade of large width, said member being threaded to said shank and adapted to move said reamer blade of large width longitudinally of said shank.

2. A smoking pipe reamer comprising a threaded shank provided with a slot, an operating handle secured at one end of said threaded shank, a reamer blade of small width secured to the other end of said threaded shank, a reamer blade of large width adapted to move in said slot, and a member carrying said reamer blade of large width, said member being threadably engaged with said shank and adapted to move said reamer blade of large width longitudinally of said shank, and there being a slot in said reamer blade of large width whereby said reamer blade of large width may move telescopically with respect to said reamer blade of small width whereby pipe bowls of a larger diameter may be reamed.

3. A smoking pipe reamer comprising a threaded shank provided with a slot, a reamer blade of small width secured to the end of said threaded shank adapted to ream pipe bowls of a small diameter, a reamer blade of large width adapted to move longitudinally of said threaded shank in the slot thereof, and a member threadably engaged with said shank and including a land and groove on the outside thereof, said reamer blade of large width including a land and groove cooperating with said land and groove of said threaded member, whereby said reamer blade of large width is connected to said member and whereby upon rotation of said threaded member said reamer blade of large width may be moved longitudinally of said threaded shank.

4. A smoking pipe reamer comprising a threaded shank provided with a slot, a reamer blade of small width secured to the end of said threaded shank adapted to ream pipe bowls of a small diameter, a reamer blade of large width adapted to move longitudinally of said threaded shank in the slot thereof, and a member threadably engaged with said shank and including a land and groove on the outside thereof, said reamer blade of large width including a land and groove cooperating with said land and groove of said threaded member, whereby said reamer blade of large width is connected to said member and whereby upon rotation of said threaded member said reamer blade of large width may be moved longitudinally of said threaded shank, said reamer blade of large width being provided with a slot whereby said reamer blade of large width may move telescopically with respect to said reamer blade of small width and whereby pipe bowls of a large diameter may be reamed.

5. In a smoking pipe reamer having a pair of reamer blades of different sizes in telescoping relationship, means for supporting the smaller one of said reamer blades; and means supported by the said first means and engaging the larger one of said reamer blades, the means engaging the larger one of said reamer blades being adapted to move the larger one of said reamer blades telescopically with respect to the smaller one of said reamer blades.

6. In a smoking pipe reamer having a pair of reamer blades of different sizes in telescoping relationship, a shank supporting the smaller one of said reamer blades, and a member mounted on said shank engaging the larger one of said reamer blades and adapted to move said last named reamer blade telescopically with respect to the smaller one of said reamer blades.

DAVID W. MADDEN.

REFERENCES CITED

The following references are of record in the file of this patent:

UNITED STATES PATENTS

| Number | Name | Date |
|---|---|---|
| 981,578 | Lawrence | Jan. 10, 1911 |
| 1,851,124 | Malsbury | Mar. 29, 1932 |